R. CAUDRON.
CONTROLLING MECHANISM.
APPLICATION FILED MAY 25, 1917.

1,315,759.

Patented Sept. 9, 1919.
5 SHEETS—SHEET 1.

Witnesses:
M. E. McAde
C. F. Kesler

Inventor
René Caudron
by
James L. Norris,
Attorney

R. CAUDRON.
CONTROLLING MECHANISM.
APPLICATION FILED MAY 25, 1917.

1,315,759.

Patented Sept. 9, 1919.
5 SHEETS—SHEET 2.

Witnesses:

Inventor
René Caudron
by
Attorney

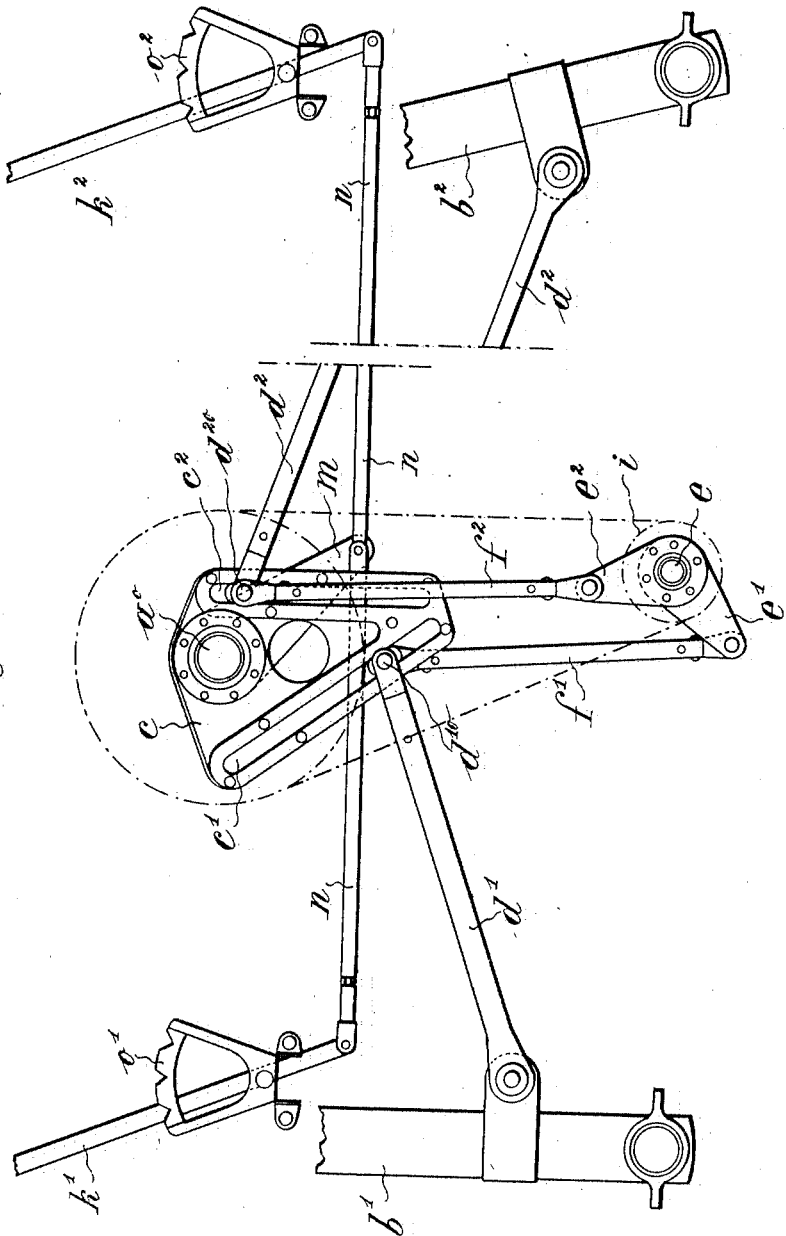

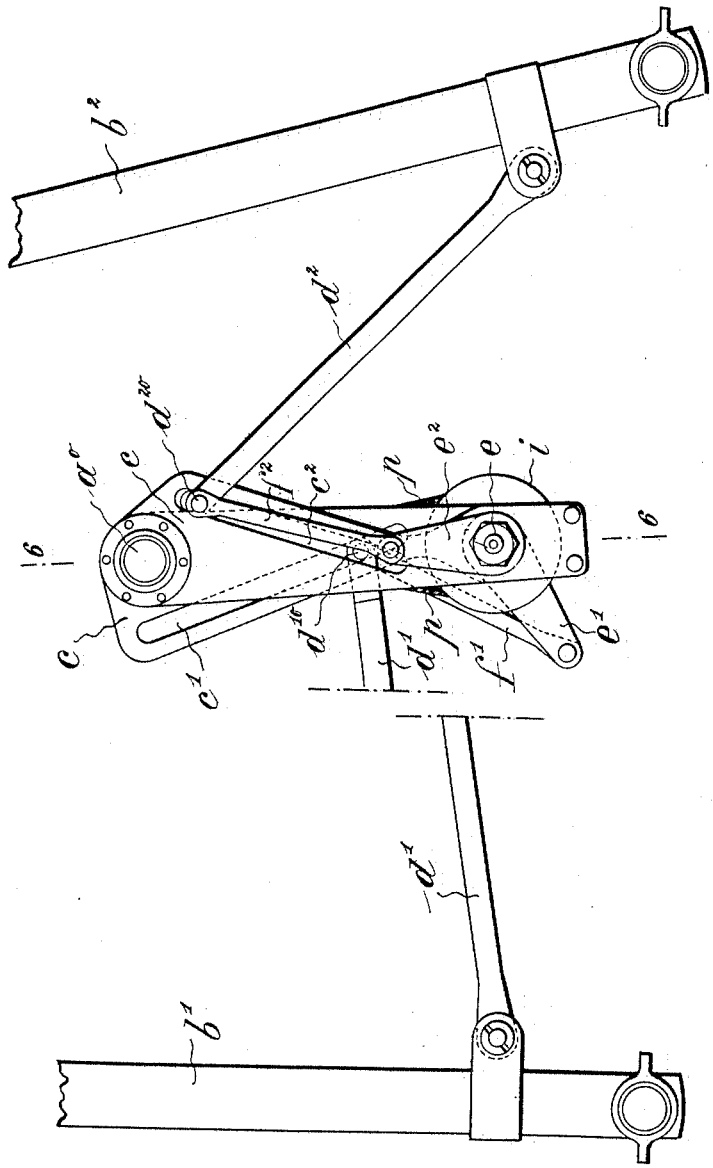

R. CAUDRON.
CONTROLLING MECHANISM.
APPLICATION FILED MAY 25, 1917.

1,315,759.

Patented Sept. 9, 1919.
5 SHEETS—SHEET 5.

Witnesses:
M. E. McDade
C. Kesler

Inventor
René Caudron
by
James L. Norris,
Attorney

UNITED STATES PATENT OFFICE.

RENÉ CAUDRON, OF ISSY LES MOULINEAUX, FRANCE.

CONTROLLING MECHANISM.

1,315,759.        Specification of Letters Patent.     Patented Sept. 9, 1919.

Application filed May 25, 1917. Serial No. 170,989.

*To all whom it may concern:*

Be it known that I, RENÉ CAUDRON, manufacturer, citizen of the French Republic, residing at Issy les Moulineaux, Department of Seine, France, have invented certain new and useful Improvements in Controlling Mechanisms, of which the following is a specification.

This invention relates to contrivances adapted to enable mechanism to be controlled or governed from different points by means of several operating members, and this in acting either on any one of the operating members, the other or the others being immobilized, or on several of the said operating members simultaneously; and it concerns more particularly such of these contrivances as are destined for the control of the balancing planes, or of a rudder in two- or three-seater aeroplanes.

It has for its object chiefly so to arrange a controlling mechanism for the latter purpose as to enable a pilot during the flight of an aeroplane, of a two-seater or three-seater type, readily to exchange his seat with that of a passenger, and vice versa, or to enable several passengers simultaneously to actuate the controlling contrivance without detriment or risk.

To this end the invention broadly consists in connecting a plurality of actuating members to a single element integral with the member to be controlled, so that the point of attachment of each of the parts connecting the corresponding actuating member to the said element may be displaced or moved at will, for the requisite manipulation of the mechanism as will be more clearly understood from the following description with the aid of the accompanying drawings illustrating more or less diagrammatically, constructional examples of this invention.

Fig. 4 shows in elevation and in lateral view a constructional form of the above arrangement.

Figs. 5 and 6 show in elevation and in side view respectively and in section on the line 6—6 of Fig. 5, a second constructional form thereof.

Figure 7:
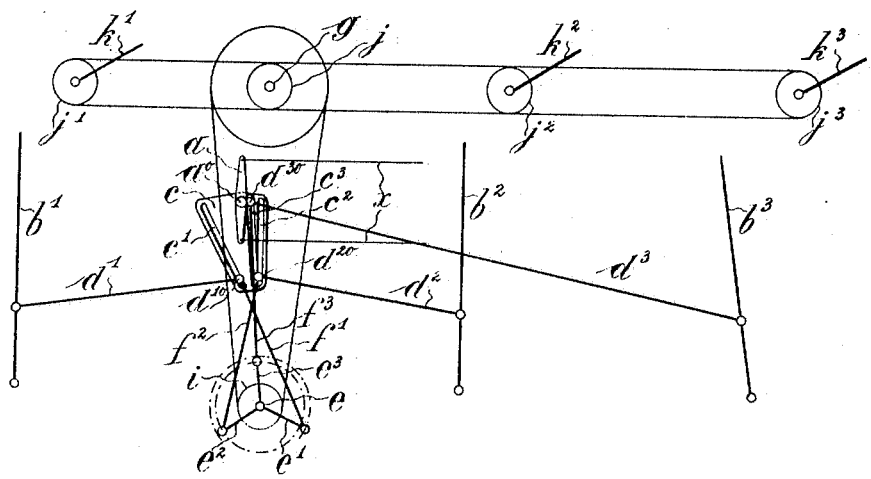
Figure 8:
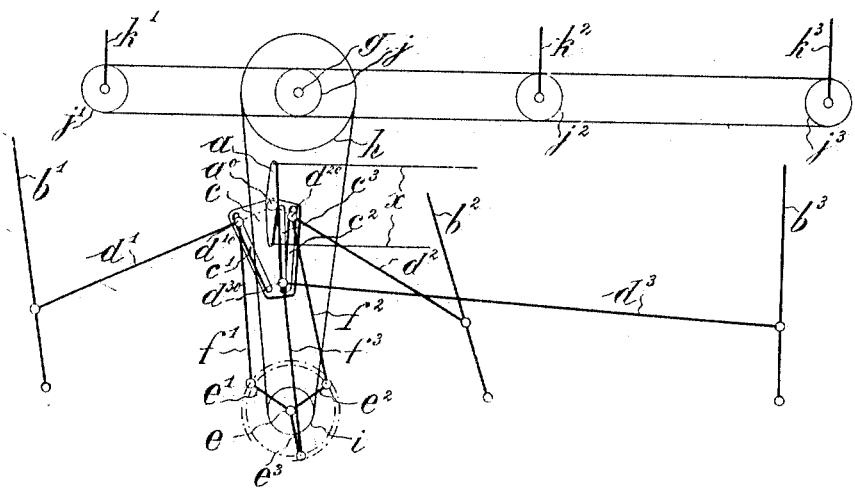

Figs. 7 and 8 finally show, diagrammatically, in two different positions, a controlling contrivance according to this invention, having three operating members for use preferably in the control of the horizontal rudder of an aeroplane of the three seater type.

Figure 1:
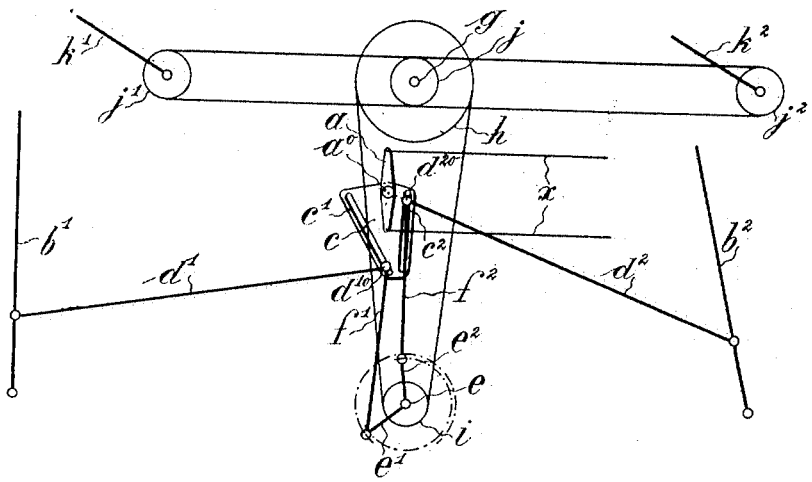
Figures 1, 2 and 3 show diagrammatically in three different positions a controlling contrivance arranged according to this invention with two operating members and adapted to be utilized for example in the control of the horizonal rudder of an aeroplane of the two-seater type.
Figure 2:
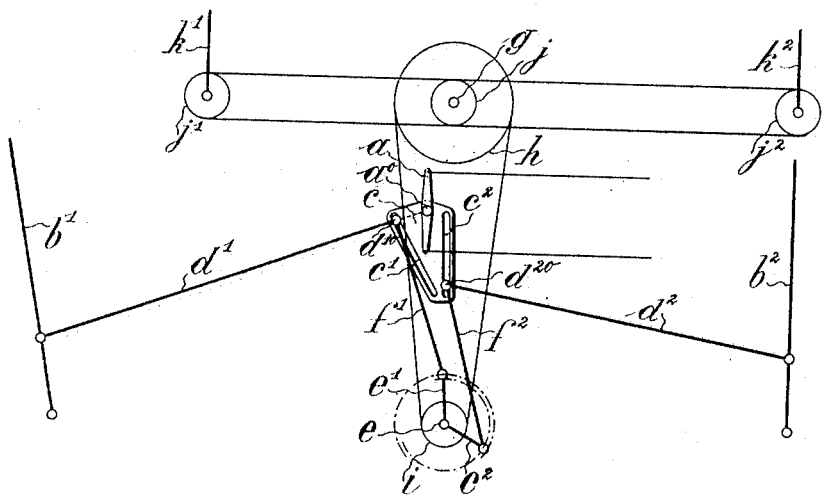

Now, according to Figs. 1 and 2 showing an aeroplane of the two-seater type, in order to enable the horizontal rudder thereof to be controlled either from the seat of the passenger alone or from the seat of the pilot alone or, at the same time, from the seats both of the pilot and the passenger, provision is made on the said aeroplane at proper points with regard to the two seats of two controlling levers $b^1$ and $b^2$ so that the balancing lever $a$ is situated between the said levers $b^1$ and $b^2$.

Secured upon the axis $a^0$ is a member $c$ provided with two sliding grooves $c^1$ and $c^2$ conveniently disposed one with regard to the other and with regard to the axis $a^0$.

The controlling levers $b^1$, $b^2$ are connected to the sliding grooves $c^1$, $c^2$ by connecting rods $d^1$, $d^2$. These connecting rods are at one end jointed to the levers $b^1$, $b^2$ and at their other end are arranged to engage, by means of sliding joints or heads $d^{10}$, $d^{20}$ respectively in the grooves $c^1$, $c^2$.

A bell crank lever $e^1$, $e^2$ is secured on a shaft $e$ which is journaled at an appropriate point in the framework of the aeroplane so that the arms $e^1$, $e^2$ are respectively situated on the same side and in the same plane as the grooves $c^1$, $c^2$ with regard to the axis $a^0$. The two arms $e^1$, $e^2$ form between them an angle of 120° and are located at a sufficient distance from the axis $a^0$ so as not to encumber the arrangement.

The ends of the lever arms $e^1$, $e^2$ are connected to the sliding joints $d^{10}$, $d^{20}$ respectively by rods $f^1$, $f^2$ and the length of the arms $e^1$, $e^2$ is such as to enable, by rotation of the bell crank lever, one of the sliding joints $d^{10}$, $d^{20}$ to be brought into such position that the prolongation of the corresponding connecting rod passes through the axis $a^0$, its adjacent end being as close as possible to the said axis.

For the purpose of controlling the rotation of the two-armed lever $e^1$, $e^2$, the following mechanism is provided.

Journaled in the framework of the aeroplane in the plane of, and parallel with the shaft $e$, is a shaft $g$ mounted on which is a grooved pulley $h$ connected by an endless cable to a smaller pulley $i$ secured to the shaft $e$. Mounted, moreover, on the shaft $g$ is a double grooved pulley $j$ connected by endless cables respectively to two pulleys $j^1$, $j^2$ fast on shafts journaled in proximity to the controlling levers $b^1$, $b^2$, the rotation of the said pulleys being effected by means of small hand levers or cranks $k^1$, $k^2$.

The mechanism thus obtained for the actuation of the balancing lever $a$ and for the control of the horizontal rudder of the two-seater aeroplane operates in the following manner:

In the position of the hand levers $k^1$, $k^2$, as shown in Fig. 1, the sliding joint $d^{10}$ is situated substantially in the prolongation of the lever $a$ while the connecting rod $d^2$ is in the position in which its longitudinal prolongation would pass through the axis $a^0$. In order, therefore, to actuate the lever $a$, only the lever $b^1$ can be operated and the movement of the lever $a$ thus effected exerts no action on the controlling lever $b^2$, in fact, it will be noticed that the sliding movement to which the head $d^{20}$ of the inoperative connecting rod $d^2$ is subjected during the operation of the connecting rod $d^1$, that is to say, the displacement which tends to vary the distance between the same and the axis $a^0$ is substantially negligible. In order to obtain a reliable function, it is sufficient to arrange the heads $d^{10}$ and $d^{20}$ in the respective sliding grooves with an easy play so as to enable them to be readily displaced during the operation.

By acting on any one of the handles $k^1$, $k^2$ and by bringing them to the position shown in Fig. 2, the bell crank lever mounted on the shaft $e$ is rotated through an angle of 120°. The connecting rod $d^1$ then occupies the position in which its prolongation passes through the axis $a^0$, while the head $d^{20}$ of the connecting rod $d^2$ is in a position, in which the lever $b^1$ is immobilized so that in order to actuate the balancing lever $a$, only the lever $b^2$ can be operated.

Figure 3:
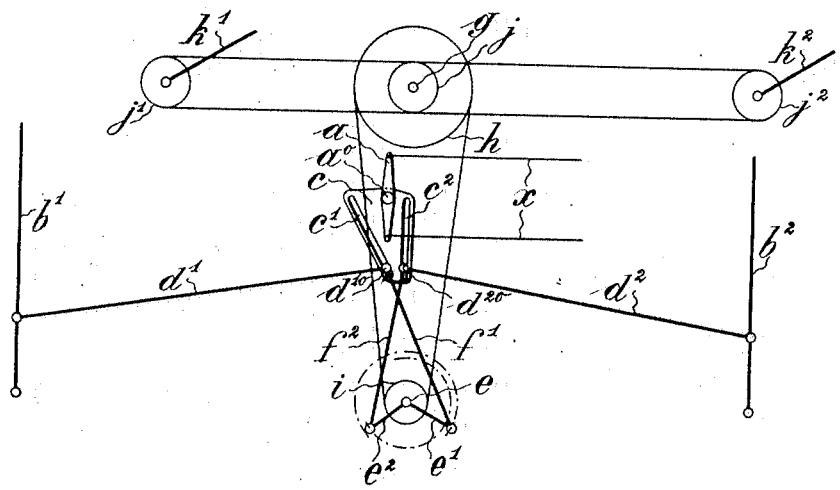

Again, by bringing one of the hand levers $k^1$, $k^2$ into a position, such as is shown in Fig. 3, so that the bell crank lever $e^1$, $e^2$ is rotated afresh through an angle of 120° always in the same sense, one of the sliding heads $d^{10}$ is located in the prolongation of the balancing lever $a$ and the other sliding head $d^{20}$ lies substantially in the same prolongation with the result that the two connecting rods $d^1$, $d^2$ are both capable of being operated simultaneously by their levers $b^1$, $b^2$ so as to effect at the same time the oscillation of the balancing lever $a$ governing the horizontal rudder.

In order to bring about the successive rotations of 120° of the double armed lever $e^1$, $e^2$, as indicated in Figs. 1 to 3 of the drawing, use may be made in the place of the pulleys $j$, $j^1$, $j^2$ and of the handles $k^1$, $k^2$ of the following mechanism.

Instead of mounting the pulley $h$ on a stub shaft $g$, it may be loosely journaled on the axis $a^0$ of the balancing lever $a$ (Fig. 4) and on the hub of the said pulley is secured a lever $m$, the end of which is connected to a horizontal bar $n$. The ends of this bar are attached respectively to two hand levers $k^1$, $k^2$ arranged close to the operating levers $b^1$, $b^2$. These hand levers may be immobilized in the three different positions which they are to occupy, for example, by means of notched quadrants $o^1$, $o^2$ similar to those employed in change speed gears in automobile vehicles.

In applying a controlling system of this kind to an aeroplane of the three seater type, the mechanism may be arranged as shown in Figs. 7 and 8, enabling the horizontal rudder to be actuated either solely from the seat of the pilot or from that of one of the passengers, or by operating simultaneously two of the three operating members, terminating respectively close to the three seats and in this latter case the following parts are added to the mechanism hereinbefore described.

A third operating lever $b^3$, a third grooved pulley $j^3$ and its actuating handle $k^3$ are provided. The two-armed lever $e^1$, $e^2$ is fitted with a third arm $e^3$ arranged at 120° with regard to the other arms and connected by means of a pitman $f^3$ to the sliding head $d^{30}$ of a third connecting rod $d^3$. This connecting rod $d^3$ is connected at one end to a sliding groove $c^3$ arranged in the common element $c$ by means of its sliding head $d^{30}$ and at its other end to the operating lever $b^3$.

The controlling contrivance thus amplified operates in the same manner as the system previously described. It will be seen from Fig. 7 that the parts occupy positions such that the levers $b^1$, $b^2$ can be actuated simultaneously whereas the lever $b^3$ is at a dead point. In Fig. 8 the parts occupy positions in which only the lever $b^3$ can bring about the operation of the balancing lever $a$ and the levers $b^1$, $b^2$ occupy dead center position. In this arrangement, moreover, the three different sliding grooves $c^1$, $c^2$, $c^3$ are so arranged that the corresponding operating levers $b^1$, $b^2$, $b^3$ are inclined forwardly in their dead center positions with the advantage of providing for the passenger, the observer or the gunner a much greater freedom of action by the liberation of substantial space.

Figure 6:
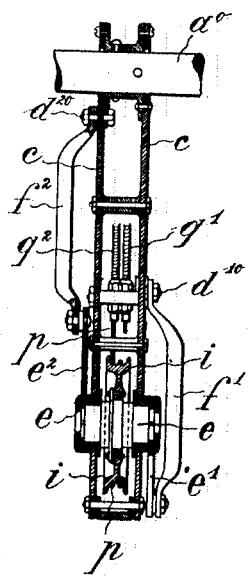

As is obvious, the invention is in no way limited to the specific arrangements hereinbefore more particularly described but is intended to include numerous modifications, such, for example, as shown in Figs. 5 and 6 of the drawing.

In this modification the common element $c$ keyed to the axis $a^9$ which carries the balancing lever $a$ shown on Fig. 3 is constituted by a strap casing having each of its compartments provided with sliding grooves $c^1$, $c^2$ adapted to receive the sliding heads $d^{10}$, $d^{20}$ of the connecting rods $d^1$, $d^2$. Loosely journaled in the lower extremity of this housing is the shaft $e$ keyed to which and offset at 120°, one with regard to the other, are the two arms $e^1$, $e^2$ connected respectively by the pitman $f^1$, $f^2$ to the sliding heads $d^{10}$, $d^{20}$. Secured to the shaft $e$, moreover, by any appropriate means, is a grooved pulley $i$ wound on which is a cable $p$, the ends of which pass into two Bowden sockets $q^1$, $q^2$ terminating at the handles $k^1$, $k^2$ not shown. This modification operates exactly in the same manner as the preceding constructions and offers the advantage of occupying a minimum space, the play to be provided for the sliding heads $d^{10}$, $d^{20}$ being absolutely insignificant.

It would be easy in a similar manner to devise a controlling system with three operating members by adding to the element $e$ above referred to, a third compartment provided with a sliding groove $c^3$ connected to a third operating lever $b^3$ by a third connecting rod $d^3$ and this by means of a third sliding head $d^{30}$. The latter is connected by a pitman $f^3$ to a further lever arm $e^3$ secured on the shaft $e$ and arranged at 120° with regard to the two other arms $e^1$, $e^2$, as will be readily understood.

Having now particularly described and ascertained the nature of my said invention and in what manner the same is to be performed, I declare that what I claim is:—

1. A multiple control apparatus comprising, in combination, an element to be controlled, a plurality of controlling elements, a governing member operatively connected to said element to be controlled and having a constant connected relation with said controlling elements, and means operative at will to alter the relation between said governing member and the controlling elements whereby one of said controlling elements is brought into operative relation therewith and another of said controlling elements is moved into inoperative relation thereto.

2. A multiple control apparatus comprising, in combination, an element to be controlled, a plurality of controlling elements, a governing member operatively connected to said element to be controlled and maintained constantly in connected relation with said controlling elements, and a plurality of setting devices for said governing member, said setting devices corresponding to the respective controlling elements and each operative to bring its respective controlling element into operating relation with the governing member and to move another of said controlling elements into non-operating relation with the governing member.

3. A plural control apparatus comprising, in combination, an element to be controlled, a plurality of controlling elements, a governing member operatively connected to said element to be controlled and maintained constantly in connected relation to said controlling elements, and means for altering the relation between said governing member and said controlling members to bring one of said controlling elements into operative relation therewith and to render another of said controlling devices inoperative with respect thereto, said means being also operative to render a plurality of said controlling devices operative with respect to said governing member.

4. A controlling mechanism for aircraft comprising, in combination, a member to be controlled, a plurality of controlling members each operative at will, an element connected to the member to be controlled and provided with a plurality of slide grooves in which the respective controlling members operate and are constantly confined, and means for relatively shifting said controlling members in said grooves to alter their operating relation with said element.

5. A controlling mechanism of the class described comprising, in combination, an element to be controlled, a plurality of controlling devices each including a connecting rod having a head, a pivoted governing member operatively connected to the element to be controlled and having grooves in which the heads on the respective connecting rods are slidable and are constantly confined, and means whereby one of said rods may be brought into an inoperative position approximately in alinement with the axis of said governing member and with its head in close proximity thereto.

6. A controlling mechanism of the class described comprising, in combination, an element to be controlled, a plurality of controlling elements each including a connecting rod having a head thereon, a governing member operatively connected to the element to be controlled and having guides thereon coöperative with said heads, a pivoted lever having arms operatively connected to the respective heads, and devices corresponding to the respective controlling elements and connected to said lever and operative to alter the positions of said heads with respect to said guides, thereby rendering one of said controlling elements operative and another of said controlling elements inoperative.

7. A dual control for air craft comprising, in combination, a member to be controlled, a pair of controlling members each operative manually at will, an element operatively connected to the member to be controlled and provided with a pair of slide grooves in which the respective controlling members operate, and means embodying cranks connected to the respective controlling members and operative to one position to shift the controlling members in their respective grooves to render one of said controlling members operative and the other controlling member inoperative, and operative to another position to render both of the controlling members operative.

8. A dual control for air craft comprising, in combination, a member to be controlled, a pair of manually operative controlling members, an element operatively connected to the member to be controlled and provided with a pair of slide grooves in which the respective controlling members operate, and a governing shaft carrying a pair of cranks set at an angle of substantially 120° and connected to the respective controlling members, said cranks being rotatable into one position to shift the controlling members in their grooves to render one of said members operative and the other member inoperative, and rotatable into another position to shift said controlling members in their grooves to render both of said members operative.

9. A dual control for air craft comprising, in combination, a pivoted element adapted to be connected to the member to be controlled and formed with a pair of grooves which terminate at points adjacent to and at opposite sides of its axis, a pair of manually operative controlling members having parts shiftable longitudinally in said grooves, and a governing shaft having a pair of cranks thereon connected to said shiftable parts of said controlling members and rotatable to bring the shiftable part of either controlling member substantially into line with the axis of said element and to bring the shiftable part of the other controlling member into the part of its groove remote from said axis.

10. A dual control for air craft comprising, in combination, a pivoted element adapted to be connected to the member to be controlled and having guides thereon extending from points remote from its axis to points adjacent to and at opposite sides of its axis, a pair of manually operative controlling members having parts connected to said element and shiftable longitudinally of the respective guides thereon, and a governing shaft carried by said element and carrying cranks operatively connected to said shiftable parts of the respective controlling members.

In testimony whereof I have hereunto set my hand in presence of two subscribing witnesses.

RENÉ CAUDRON.

Witnesses:
CHAS. P. PRESSLY,
PAUL BLUM.

Copies of this patent may be obtained for five cents each, by addressing the "Commissioner of Patents, Washington, D. C."